Figure 1:
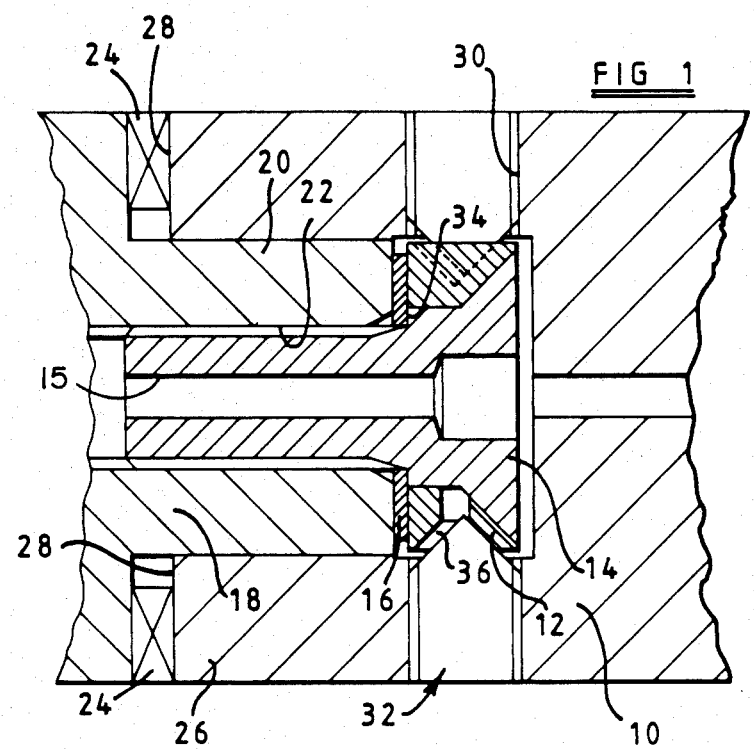

United States Patent [19]

Bassett et al.

[11] Patent Number: 4,861,203

[45] Date of Patent: Aug. 29, 1989

[54] CUTTING TOOL HOLDER ADAPTOR

[75] Inventors: Roger Bassett; Terence I. Negus, both of Cornwall, England

[73] Assignee: Multi-Bar Systems Ltd., Cornwall, England

[21] Appl. No.: 242,340

[22] Filed: Sep. 9, 1988

[30] Foreign Application Priority Data

Sep. 12, 1987 [GB] United Kingdom ............... 8721509

[51] Int. Cl.$^4$ ............................................. B23C 5/26
[52] U.S. Cl. ........................... 409/136; 82/160; 279/20; 279/83; 279/8; 279/1 A; 408/239 R; 409/234
[58] Field of Search ............ 409/231, 232, 234, 136; 82/36 B; 279/1 B, 1 L, 1 TS, 8, 83, 1 A, 20; 407/34, 11; 408/59, 239 R, 239 A

[56] References Cited

U.S. PATENT DOCUMENTS

| | | | |
|---|---|---|---|
| 1,510,282 | 9/1924 | Johnson | 279/83 |
| 2,361,324 | 10/1944 | Severson | 409/233 |
| 2,977,859 | 4/1961 | Glaser | 409/234 X |
| 3,188,997 | 6/1964 | Bruckner | 409/233 |
| 4,325,664 | 4/1982 | Mori | 409/234 |
| 4,478,541 | 10/1984 | Okada et al. | 409/232 |

FOREIGN PATENT DOCUMENTS

| | | | |
|---|---|---|---|
| 7800009 | 8/1979 | Sweden | 409/234 |
| 537770 | 7/1973 | Switzerland | 409/234 |

Primary Examiner—Z. R. Bilinsky
Attorney, Agent, or Firm—Nixon & Vanderhye

[57] ABSTRACT

The adaptor is to enable a cutting tool holder such as a boring bar to be mounted on a standard arbor having an internally screw-threaded boss and drive keys. The adaptor comprises a thrust ring, a retaining screw and a spacer. The thrust ring has a multiplicity of internally tapered recesses in its peripheral surface and is rotatably mounted on the arbor by the retaining screw. Rotation of the thrust ring is permitted to enable alignment of a respective recess with a respective locking screw in the cutting tool holder.

8 Claims, 1 Drawing Sheet

CUTTING TOOL HOLDER ADAPTOR

This invention relates to a cutting tool holder adaptor for enabling a cutting tool holder to be mounted on an arbor which is rotatably mounted in a machine tool. The invention also relates to an adaptor for mounting a holder for supporting an electronic measuring probe or other in-process inspection equipment on a machine tool arbor. Hereinafter such an adaptor will be referred to as "a tool holder adaptor". The invention also relates to a tool holder assembly comprising a tool holder and tool holder adaptor.

Standard arbors for mounting in the chucks of machine tools are well known and commonly used for mounting such cutting tools as face milling (shell mill) cutters. Such arbors are standardised at the end which receives the cutting tool so as to enable the arbor to be used with a variety of cutting tools, but the opposite end of the arbor is designed specifically to mate with a particular machine tool. Thus, the owner of any particular machine tool will possess a number of arbors which are compatible with that machine tool. Generally speaking, whatever the design of the arbor at its end which is to be engaged with the machine tool, its opposite end will include a boss having an axially extending bore therein which is internally screw-threaded to receive a fixing screw used to secure the cutting tool on the boss. The arbor also has a drive key arrangement disposed externally of the boss for engagement with a keyway arrangement in the cutting tool itself so that rotary drive can be imparted to the cutting tool when mounted on the boss. The retaining screw serves to retain the cutting tool against unwanted axial displacement relative to the boss.

However, certain types of cutting tool holder, such as spindle tooling e.g. boring bars, are not of a design which permits them to be directly mounted on a standard arbor. Thus, with such types of cutting tool holder, it is necessary to manufacture a range of these with different arbors for fitting to a range of machine tools. This is obviously relatively expensive both from the point of view of manufacture and from the point of view of stocking.

It is an object of the present invention to provide an adaptor whereby tool holders can be mounted on a standard arbor, so that the tool holder and the adaptor can be sold for mounting on the customer's own arbor.

According to one aspect of the present invention, there is provided a tool holder adaptor for enabling a tool holder having a sleeve with a keyway arrangement and a plurality of locking screws to be mounted on an arbor having an internally screw-threaded boss and a drive key arrangement, said adaptor comprising a ring having a multiplicity of recesses disposed in side-by-side relationship around its peripheral surface, said recesses tapering inwardly from the peripheral surface of the ring, and a retaining screw upon which the ring is adapted to be rotatably mounted, said retaining screw being engageable in the screw-threaded boss of the arbor so as to mount the ring rotatably on a free end of the boss, the arrangement being such that (a) the sleeve of the tool holder is slidable over the boss to a position in which the keyway arrangement can engage the drive key arrangement, and the locking screws are aligned with the peripheral surface of the ring, and (b) engagement of the locking screws in respective ones of the recesses in the ring is enabled as a result of freedom of the ring to rotate so as to adopt a position in which the recesses are aligned with the locking screws.

According to another aspect of the present invention, there is provided a tool holder assembly which is adapted to be mounted on an arbor having an internally screw-threaded boss and drive key arrangement, said assembly comprising a tool holder adaptor as defined in the last preceding paragraph in combination with a tool holder having a sleeve with a keyway arrangement and a plurality of locking screws.

Most preferably, the recesses around the peripheral surface of the ring are arranged to be substantially contiguous.

In a preferred arrangement, the retaining screw has a passage therethrough for coolant, whereby coolant can be passed through the retaining screw and into a coolant passage in the cutting tool.

The recesses in the ring are preferably conically tapered.

Figure 2:
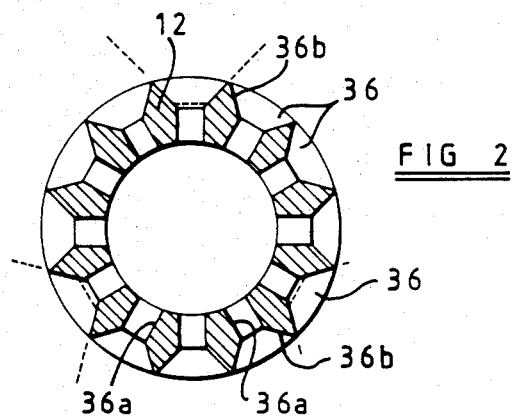

An embodiment of the present invention will now be described, by way of example, with reference to the accompanying drawing, in which:

FIG. 1 is an axial section through part of a tool holder assembly according to the present invention shown mounted on a standard shell mill arbor, and FIG. 2 is a cross-sectional view through a ring forming part of the tool holder assembly of FIG. 1.

Referring now to FIG. 1, the tool holder assembly comprises a tool holder which, in this embodiment, takes the form of a boring bar 10 at whose free end (not shown) a cutting tool tip (also not shown) is adjustably mounted in a manner known per se. The tool holder assembly also includes a tool holder adaptor comprising a thrust ring 12, a retaining screw 14, having a centrol coolant passage 15 and a spacer 16. The tool holder assembly is shown mounted on a standard shell mill arbor 18 which is only partly shown in FIG. 1. The arbor 18 includes an end portion which is not illustrated and which is designed to be compatible with the chuck of a machine tool in which it is to be mounted. Such arbor 18 is a standard component kept by the user of the machine tool to enable a shell mill cutter to be mounted on the machine tool. The illustrated end portion of the arbor 18 comprises a boss 20 which extends axially from the remainder of the arbor 18 and which has an internally screw-threaded, axially extending bore 22 therethrough. The bore 22 normally receives a retaining screw for securing a shell mill cutter mounted on the boss 20 against unwanted axial displacement. The arbor 18 also includes a pair of radially extending drive keys 24 which are disposed externally of the boss 20 and which are engaged, in use, in corresponding key ways in the milling cutter when the latter is mounted on the boss 20.

The boring bar 10 terminates in a sleeve 26 which is a close sliding fit over the boss 20. The left hand end of the sleeve 26 as viewed in FIG. 1 has a pair of recesses therein which define key ways 28 in which the drive keys 24 are respectively engaged when the tool holder assembly is correctly mounted on the arbor 18. At its inner end, the sleeve 26 has a set of three equi-angularly spaced, radially extending bores 30 therethrough. The bores 30 are internally screw threaded and receive respective locking screws 32 whose inner ends are conically tapered as shown in FIG. 1. The bores 30 are disposed so as to be axially aligned with the peripheral surface of the thrust ring 12 when the sleeve 26 is mounted on the boss 20 with the drive keys 24 engaged with the key ways 28. The retaining screw 14 is engaged in the bore 22 and serves to mount the thrust ring 12 on the end of the boss 20. The spacer 16 engages against the free end of the boss 20 and also against an abutment surface 34 on the screw 14 so as to provide a stop to prevent overtightening of the screw 14 in the bore 22. The arrangement is such that, with the screw fully tightened to the extent permitted by the spacer 16, the thrust ring 12 is securely mounted in the desired position but is free to rotate about the axis of the retaining screw 14. The outer diameter of the thrust ring 12 is marginally less than that of the boss 20. A series of twelve radial bores 36 are provided in side-by-side relationship around the peripheral surface of the ring 12. Each radial bore 36 includes an inner cylindrical bore portion 36a and an outer, frusto-conical portion 36b. This is most clearly shown in FIG. 2 where it will be seen that the frusto-conical bore portions 36b taper radially inwardly from the peripheral surface of the thrust ring 12. The bore portions 36b define recesses in the peripheral surface of the thrust ring 12 and, as depicted in FIG. 2, such recesses are contiguous around the peripheral surface of the thrust ring 12. In this embodiment, the cone angle of the locking screws 32 and that of the frusto-conical bore portions 32b is 90°. The thickness of the spacer 16 is chosen so that, when the cutting tool is mounted on the arbor with the drive keys 24 fully engaged in the key ways 28, the plane in which the axes of the locking screws 32 lie is slightly displaced from that in which the bores 36 lie, the displacement being in a direction away from the key ways 28. By virtue of this, tightening of the locking screws 32 serves to clamp the tool holder more firmly into engagement with the arbor 18.

During mounting of the tool holder assembly on the arbor 18, the sleeve 26 is passed over the boss 20 and angularly orientated so that the key ways 28 become aligned with the drive keys 24 so that mutual engagement takes place. One of the locking screws 32 is then rotated to move it radially inwardly so as to engage in a respective one of the bores 36 in the thrust ring 12. It will not always be the case that the locking screw 32 is fully aligned with one of the recesses 36. However, because the thrust ring 12 is free to rotate, tightening of the locking screw 32 will cause the tapered surface thereof to contact the frusto conically tapered bore portion 36, thereby to permit slight rotation of the thrust ring 12 to effect proper alignment in the circumferential direction. This also brings other bores 36 into respective alignment with the other locking screws 32 which can then be tightened fully to hold the tool holder assembly firmly against axial movement relative to the arbor 18.

With such a construction, correct engagement of the locking screws 32 in the bores 36 is permitted and there is no need to provide for critical angular positioning of the bores 30 relative to the key ways 28. Additionally, wear in the parts which might affect firm locking of the tool holder assembly against axial displacement can be relatively easily compensated for by appropriate choice of the thickness of the spacer 16.

While in the embodiment described above, the tool holder assembly has been described in relation to a tool holder in the form of a boring bar, it is to be appreciated that the present invention can also be applied to spindle tooling generally e.g. drill chuck adaptors, collet chuck adaptors, morse taper adaptors, milling cutter extensions, end mill holders and tap holders: and also to holders for electronic measuring probes and other in-process inspection equipment which is to be mounted in a machine tool.

We claim:

1. A tool holder adaptor for enabling a tool holder having a sleeve with a keyway arrangement and a plurality of locking screws to be mounted on an arbor having an internally screw-threaded boss and a drive key arrangement, said adaptor comprising a ring having a multiplicity of recesses disposed in side-by-side relationship around its peripheral surface, said recesses tapering inwardly from said peripheral surface of the ring, and a retaining screw upon which said ring is adapted to be rotatably mounted, said retaining screw being engageable in the screw-threaded boss of the arbor so as to mount said ring rotatably on a free end of the boss, the arrangement being such that (a) the sleeve of the tool holder is slidable over the boss to a position in which the keyway arrangement can engage the drive key arrangement, and the locking screws are aligned with the peripheral surface of said ring, and (b) engagement of the locking screws in respective ones of said recesses in said ring is enabled as a result of freedom of said ring to rotate so as to adopt a position in which said recesses are aligned with the locking screws.

2. An adaptor according to claim 1, wherein said recesses around the peripheral surface of said ring are substantially contiguous.

3. An adaptor according to claim 1, wherein the retaining screw has a passage therethrough for coolant.

4. An adaptor according to claim 1, wherein said recesses in said ring are conically tapered.

5. A tool holder assembly which is adapted to be mounted on an arbor having an internally screw-threaded boss and drive key arrangement, said assembly comprising a tool holder adaptor in combination with a tool holder having a sleeve with a keyway arrangement and a plurality of locking screws, said adaptor comprising a ring arrangement, said adaptor comprising a ring having a multiplicity of recesses disposed in side-by-side relationship around its peripheral surface, said recesses tapering inwardly from said peripheral surface of the ring, and a retaining screw upon which said ring is adapted to be rotatably mounted, said retaining screw being engageable in the screw-threaded boss of the arbor so as to mount said ring rotatably on a free end of the boss, the arrangement being such that (a) the sleeve of the tool holder is slidable over the boss to a position in which the keyway arrangement can engage the drive key arrangement, and the locking screws are aligned with the peripheral surface of said ring, and (b) engagement of the locking screws in respective ones of said recesses in said ring is enabled as a result of freedom of said ring to rotate so as to adopt a position in which said recesses are aligned with the locking screws.

6. An assembly according to claim 5, wherein said recesses around the peripheral surface of said ring are substantially contiguous.

7. An assembly according to claim 5, wherein said retaining screw has a passage therethrough for coolant, whereby coolant can be passed through said retaining screw and into a coolant passage in the tool.

8. An assembly according to claim 5, wherein said recesses in said ring are conically tapered.

* * * * *